US011008256B2

(12) United States Patent
Kierat et al.

(10) Patent No.: US 11,008,256 B2
(45) Date of Patent: May 18, 2021

(54) SILICA-COATED EXPANDING AGENTS AND THEIR USE IN CEMENTITIOUS SYSTEMS

(71) Applicant: BASF SE, Ludwigshafen am Rhein (DE)

(72) Inventors: Radoslaw Kierat, Ludwigshafen am Rhein (DE); Michael Klemens Mueller, Ludwigshafen am Rhein (DE); Andreas Kempter, Ludwigshafen am Rhein (DE); Oscar Lafuente Cerda, Trostberg (DE); Kai Bergner, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 195 days.

(21) Appl. No.: 16/094,557

(22) PCT Filed: Apr. 7, 2017

(86) PCT No.: PCT/EP2017/058408
§ 371 (c)(1),
(2) Date: Oct. 18, 2018

(87) PCT Pub. No.: WO2017/182296
PCT Pub. Date: Oct. 26, 2017

(65) Prior Publication Data
US 2019/0119161 A1 Apr. 25, 2019

(30) Foreign Application Priority Data
Apr. 18, 2016 (EP) .................... 16165787

(51) Int. Cl.
B05D 7/00 (2006.01)
B32B 5/16 (2006.01)
(Continued)

(52) U.S. Cl.
CPC ...... *C04B 20/1085* (2013.01); *C04B 20/1074* (2013.01); *C04B 22/064* (2013.01);
(Continued)

(58) Field of Classification Search
CPC .......... C08K 7/24; C08K 9/02; C04B 41/009; C04B 20/1066; C04B 20/1074; C04B 20/1085; C09C 1/02; C09C 3/063
(Continued)

(56) References Cited

U.S. PATENT DOCUMENTS 4,332,619 A 6/1982 Gandy et al.
5,118,527 A 6/1992 Wilson
(Continued)

FOREIGN PATENT DOCUMENTS

EP 2169027 A1 3/2010
FR 710302 A 8/1931
(Continued)

OTHER PUBLICATIONS

European Search Report for EP Patent Application No. 16165787.9, dated Nov. 10, 2016, 3 pages.
(Continued)

*Primary Examiner* — Hoa (Holly) Le
(74) *Attorney, Agent, or Firm* — Faegre Drinker Biddle & Reath LLP

(57) ABSTRACT

The invention relates to a process for preparing silica-coated particles of an inorganic expanding agent, the silica-coated particles and their use. The silica-coated particles show a delayed release of the expanding agent particularly in alkaline medium and at elevated temperatures. They are therefore useful in the oil and construction industry.

19 Claims, 2 Drawing Sheets

(51) Int. Cl.
*C04B 20/10* (2006.01)
*C04B 28/02* (2006.01)
*C04B 40/06* (2006.01)
*C04B 22/06* (2006.01)
*C04B 111/00* (2006.01)
*C04B 111/34* (2006.01)
*C04B 111/60* (2006.01)
*C04B 111/70* (2006.01)
*C04B 111/72* (2006.01)
*C04B 111/62* (2006.01)
*C04B 111/28* (2006.01)

(52) U.S. Cl.
CPC ............ *C04B 22/066* (2013.01); *C04B 28/02* (2013.01); *C04B 40/0641* (2013.01); *C04B 2111/00146* (2013.01); *C04B 2111/00482* (2013.01); *C04B 2111/00637* (2013.01); *C04B 2111/28* (2013.01); *C04B 2111/34* (2013.01); *C04B 2111/60* (2013.01); *C04B 2111/62* (2013.01); *C04B 2111/70* (2013.01); *C04B 2111/72* (2013.01)

(58) Field of Classification Search
USPC .................................................. 427/213, 219
See application file for complete search history.

(56) References Cited

U.S. PATENT DOCUMENTS

| | | | |
|---|---|---|---|
| 5,741,357 A | 4/1998 | Sheikh | |
| 6,132,773 A * | 10/2000 | Amiche | A01N 25/26 424/403 |
| 8,202,362 B2 | 6/2012 | Davidovits et al. | |
| 8,871,299 B2 * | 10/2014 | Kecht | C09K 11/025 427/212 |
| 2005/0037201 A1 * | 2/2005 | Hirai | C03C 17/007 428/403 |
| 2005/0230659 A1 * | 10/2005 | Hampden-Smith | C01B 3/326 252/189 |
| 2015/0147469 A1 * | 5/2015 | Muraguchi | C09D 7/61 427/220 |
| 2017/0058239 A1 | 3/2017 | Hartmann et al. | |
| 2018/0355285 A1 | 12/2018 | Jaekel et al. | |
| 2020/0299202 A1 * | 9/2020 | Choi | C04B 20/04 |

FOREIGN PATENT DOCUMENTS

| | | |
|---|---|---|
| WO | WO 2000037359 A1 * | 6/2000 |
| WO | WO-08012438 A2 | 1/2008 |
| WO | WO-2013023949 A2 | 2/2013 |
| WO | WO-2014/096349 A1 | 6/2014 |
| WO | WO-2015/169344 A1 | 11/2015 |

OTHER PUBLICATIONS

International Search Report for PCT/EP2017/058408 dated Aug. 2, 2017.
Written Opinion of the International Searching Authority for PCT/EP2017/058408 dated Aug. 2, 2017.

* cited by examiner

SILICA-COATED EXPANDING AGENTS AND THEIR USE IN CEMENTITIOUS SYSTEMS

CROSS-REFERENCE TO RELATED APPLICATIONS

This application is a national stage application (under 35 U.S.C. § 371) of PCT/EP2017/058408, filed Apr. 7, 2017, which claims benefit of European Application No. 16165787.9, filed Apr. 18, 2016, both of which are incorporated herein by reference in their entirety.

The invention relates to a process for preparing silica-coated particles of an inorganic expanding agent, the silica-coated particles and their use.

BACKGROUND

Cementitious systems harden with a slight loss in volume (shrinkage). As a consequence thereof, crack formation may occur which impairs the strength of the concrete. In the oil and gas industry bonding between set cement and casing or formation is reduced so that a small gap or microannulus may form at the cement/casing and/or cement/formation interface, in particular under the thermal and mechanical stress that occurs in connection with oil and gas drilling operations. Under these circumstances an effective zonal isolation cannot be achieved.

To avoid the shrinkage expansive cements have been used which are hydraulic cements that, after setting, increase in volume to significantly greater degree than Portland cement paste to form an expanded set cement. The increase in volume is often achieved by adding expanding agents such as fibers, magnesium oxide or calcium oxide. However, the use of such expanding agents is problematic since the expanding agents known in the art begin to hydrate and thus begin to expand as soon as they contact water (CaO) or begin to hydrate too late as they are very slowly reacting (MgO). Therefore, the expanding agent can in many cases not be added to the cement slurry because the expanding agent is going to expand too early, i.e. before the cement slurry is positioned at the desired location leading to significant disadvantages.

Various efforts to delay expansion have been suggested. Coating of metal oxide particles with non-hydratable or previously hydrated minerals such as metal carbonates, hydroxides and hydrates was suggested in U.S. Pat. Nos. 4,332,619, 5,741,357, EP2169027A1; but these materials can be difficult to prepare and have had only limited success. Also the coating of core particles with water glass is known, for example, from WO 2013/023949 which describes a powder having a calcium oxide core and a shell formed of amorphous silicon dioxide. The powder is prepared by generating an aerosol by atomizing a solution of a hydrolysable or oxidizable calcium compound with an atomizing gas; igniting a mixture of the aerosol, a hydrogen-containing gas and an oxygen-containing gas at 900-1200° C.; feeding a hydrolysable or oxidizable silicon compound at a temperature of 700-750° C. and cooling the reaction mixture to <600° C. This results in a nano-scale product in which the thickness of the coating is in the lower nanometer range. Such a product is unsuitable as an expanding agent for cement mainly due to the small particle size and the thin coating. U.S. Pat. No. 5,118,527 discloses a method for protecting aluminum flakes in a dry grout against abrasion. Protection is effected by a coating of water glass which is instantaneously removed by contact with alkaline water so that the aluminum flakes can react with the water and act as expanding agent. Due to the development of hydrogen and the instantaneous reaction with water the protected aluminum flakes are unsuitable as an expanding agent for cement. FR 710 302 discloses a hardening accelerator for cement which is obtained by coating sand, gravel or a pozzolan with water glass and converting the water glass to a hydrated silicic acid gel. The hardening accelerator is unsuitable as an expanding agent for cement.

The problem underlying the invention was therefore to provide expanding agents that show a delayed expanding effect, i.e. that develop their expanding effect not immediately after contact with water but only after a certain period of time that is sufficient to allow the desired handling, positioning and/or setting of the cement slurry. Furthermore, the expanding agents should be able to be exposed to increased temperature conditions without premature development of the expanding effect.

SUMMARY OF THE INVENTION

This problem was solved by a process for preparing silica-coated particles of an inorganic expanding agent, the silica-coated particles and their use in cementitious systems.

The process for preparing silica-coated particles of an inorganic expanding agent comprises the steps of
(a) providing particles of an inorganic expanding agent, preferably an expanding agent which is selected from calcium oxide, magnesium oxide, strontium oxide, barium oxide, and mixed oxides thereof, calcium sulfate hemihydrate, anhydrite, sodium sulfate, magnesium sulfate, phyllosilicates, and mixtures of two or more thereof and which has a particle size d(50), as determined by static light scattering, in the range from about 1 µm to about 100 µm,
(b) contacting the particles of the inorganic expanding agent with an aqueous solution or dispersion of a silica precursor to form particles which are at least partially coated,
(c) converting the silica precursor to silica by contacting the silica precursor with a conversion agent,
(d) drying the coated particles, and
(e) subjecting the coated particles to a heat treatment.

Further, the invention relates to the particles which are obtainable according to the process of the invention and to the use of said particles in cementitious systems.

DETAILED DESCRIPTION

Figure 1:
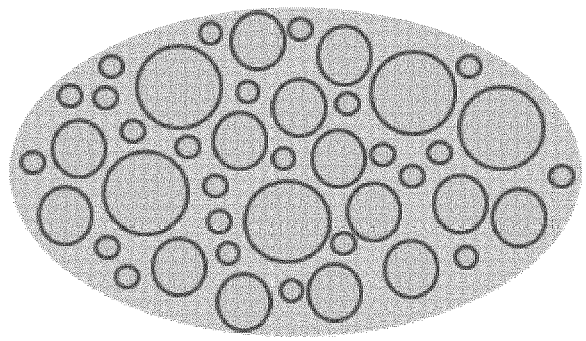
FIG. 1 is a schematic diagram of the coated particles without heat-treatment.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that any and all data points within the range are to be considered to have been specified, and that the applicant has possession of the entire range and all points within the range.

The term "and/or" refers to both the inclusive "and" case and the exclusive "or" case, and such terms are used herein for brevity.

The term "comprising" is intended to include the narrower term "consisting of", but not to be synonymous therewith.

An expanding agent is any inorganic material, which, when added to hydraulic cement, tends to increase the volume of the set cement, e.g., a hydratable material that hydrates with water to form a product having a larger volume relative to the hydratable material.

As used herein, the terms "shell" and "coating" are used synonymously to mean the outermost one or group of layers covering or over a surface of a body, but need not directly contact the surface.

The term "silica" is synonymous to silicon dioxide and the term "silica" is used in the following.

The term "coated particle" refers to a particle comprising the expanding agent as a core which is at least partially coated with a water-permeable coat (shell). The term also refers to a particle comprising a silica matrix in which particles of the expanding agent are dispersed as a core material throughout the matrix. Thus, the particles may comprise a single-core arrangement or configuration, i.e., a single core at least partially contained within a water permeable shell and/or may comprise a "matrix-island" arrangement or configuration in which the expanding agent is distributed at least partially within each particle as small islands within a matrix of the encapsulating coating material (cf. FIG. 1), e.g., the expanding agent is dispersed as a discontinuous phase within the continuous shell material. Unless stated otherwise, reference to a coated particle includes both single core-shell and preferably matrix-island arrangements.

In embodiments, the water permeable coat may include components or sections which are at least partially soluble in water. The coat may have pores, voids, and/or discontinuities within the coat which allow water to pass through the coat and contact the particles. As used herein, a water permeable coat may also include a coat which allows diffusion of water through the coat e.g., via partial solubility and/or osmosis.

Step (a)

In an embodiment, the expanding agent is an agent that is capable to expand (swell) upon hydration. In another embodiment the expanding agent comprises a metal oxide which hydrates to form the corresponding expanded product (in other words, the expanding agent is capable to swell in contact with water). Examples include calcium oxide, magnesium oxide, strontium oxide, barium oxide, or combinations or mixed oxides thereof. In another embodiment, the expanding agent comprises calcium oxide, magnesium oxide, or a combination thereof. In another embodiment, the expanding agent comprises calcium oxide and magnesium oxide in any mixing ratio. In another embodiment calcium oxide and magnesium oxide are used in a molar mixing ratio of 1:100 to 100:1, or 1:20 to 20:1 or 1:10 to 10:1 or 1:5 to 5:1. In a further embodiment, the mixture of calcium oxide and magnesium oxide is obtained from dolomite so that the molar mixing ratio is 1:1. It is advisable to avoid contact of the expanding agent with water or humidity in order to keep the hydrated amount of the expanding agent thereof as low as possible.

In another embodiment the expanding agent is selected from calcium sulfate hemihydrate or anhydrite, sodium sulfate, magnesium sulfate, and sodium chloride.

In another embodiment the expanding agent is a silicate which is capable to expand in contact with water. Suitable silicates are phyllosilicates such as clays. Examples include bentonite, montmorillonite, smectite, nontronite, beidellite, perlite or vermiculite.

The expanding agent may be used in powder form. In an embodiment, the particles of the expanding agent have an average particle size d(50) in the range from about 1 μm to about 100 μm, preferably in the range from about 10 μm to about 90 μm, in particular from about 20 μm to about 60 μm, prior to coating, as determined by static light scattering (SLS; method see below).

Steps (b), (c), and (d)

The expanding agent is provided as a powder which is contacted with an aqueous solution or dispersion of a silica precursor to form particles which are at least partially coated with the silica and/or the silica precursor. In an embodiment said contact is achieved by applying, in particular by spraying, an aqueous solution or dispersion of the silica precursor to the particles of the expanding agent. The term "silica precursor" means a compound that can be converted to silica either by heating the precursor during the drying step or by using a conversion agent. The silica precursor may be an alkali metal silicate or a precondensed alkali metal silicate that can be further condensed and converted to the silica network by said heating or conversion agent.

In an embodiment, the silica precursor is a water-soluble alkali metal silicate (here water-soluble means an alkali metal silicate having a solubility of ≥100 g alkali metal silicate per 1 L water). In another embodiment, the alkali metal silicate is selected from compounds having the empirical formula m $SiO_2.nM_2O$, where M stands for Li, Na, K, and $NH_4$, and also mixtures thereof, preferably for Na and K. The molar ratio m:n (also called "modulus") is advantageously 0.5 to 4.0, preferably 1.0 to 4.0 and more particularly 2.0 to 4.0 or 2.6 to 4.0 or 2.3 to 3.5. The alkali metal silicate is preferably water glass, more preferably a liquid water glass, and more particularly a sodium or potassium water glass. Use may also be made, however, of lithium or ammonium water glasses, and also of mixtures of the said water glasses.

Water glasses in the above modulus range are commercialized as aqueous solutions. The solids contents of the aqueous water glass solutions are generally 20% to 60% by weight, preferably 30% to 50% by weight.

In another embodiment the silica precursor is a dialkoxysilane, trialkoxysilane or tetraalkoxysilane (the alkyl group in said silane is preferably a $C_1$-$C_4$ alkyl group). The silanes are applied in a solvent that can be water and/or water miscible solvents (e.g. acetone).

The silica precursor is used as an aqueous solution which preferably contains the precursor in a concentration of 5% to 40% by weight, in particular 5% to 30% by weight.

The silica precursor is used in an amount such that the weight ratio of inorganic expanding agent to silica is in the range from 15:1 to 1:2, preferably from 10:1 to 1:1.

Conversion of the silica precursor to silica depends on the type of precursor. If the precursor is a water-soluble alkali metal silicate, an acid is added to the precursor to achieve conversion to silica. Suitable acids are water-soluble (water-soluble means an acid having a solubility of ≥100 g per 1 L water) inorganic and organic acids having a pKa of ≤5. Examples for such acids are hydrochloric acid, hydrobromic acid, sulfuric acid, phosphoric acid, nitric acid, methane sulfonic acid, toluene sulfonic acid, benzene sulfonic acid, formic acid, acetic acid, etc. The concentration of the acid is advantageously ≤1.5 N, in particular ≤1.2 N.

If the precursor is an alkoxysilane, for example tetraethoxysilane, the conversion is initiated by the addition of water, preferably of acidic or alkaline pH (for example, pH 3-4 or 10-11) and a water-miscible organic solvent such as ethanol.

When carrying out steps (b) to (d) it is critical to avoid premature gelling of the inorganic expanding agent. This has to be achieved by control of the amount of water available at any moment in said steps (b) to (d). In this regard it is advantageous to use the fluidized bed technology or the spouted bed technology for drying the particles in step (d). In some embodiments, steps (b) to (d) are carried out in accordance with the following options below. In said options application of the silica precursor and/or of the agent for converting the silica precursor to silica is carried out by spraying them onto the particles of the inorganic expanding agent in the spouted bed or fluidized bed apparatus.

The particles of the inorganic expanding agent are placed into the fluidized bed or spouted bed apparatus and the apparatus is put into operation. As soon as the content of the apparatus has reached the operating temperature, the precursor solution is applied, preferably by spraying, with the following options:

(1) The total amount of the acid as conversion agent is added to the initial precursor solution. The amount of acid is such that the pH of the solution is still in the alkaline range, i.e. in the range from 8 to 9. This results in a further precursor solution containing a silicate in which the condensation to silica is further advanced but not yet completed. This precursor solution is then applied to the particles of the inorganic expanding agent and the condensation to the silica network is completed at the drying temperature.

(2) Only a part of the agent for conversion of the silica precursor to silica, preferably the acid having a pKa of ≤5, is added to the precursor solution prior to the application of the precursor solution to the particles of the inorganic expanding agent. The amount of acid is such that the pH of the solution is still in the alkaline range, i.e. in the range from 10 to 12. This achieves a partial condensation of the alkali metal silicate which is less advanced relative to the condensation when using the total amount of acid. The precursor solution is then applied to the particles of the inorganic expanding agent by spraying it into the operating fluidized bed or spouted bed apparatus. A second part of the acid can then be applied simultaneously with or subsequently to the acid-treated precursor solution by spraying it into the operating fluidized bed or spouted bed apparatus.

(3) The unacidified precursor solution is applied to the particles of the inorganic expanding agent and simultaneously the solution of the conversion agent is applied by spraying them into the operating fluidized bed or spouted bed apparatus. This includes that the conversion agent is applied at any time after the application of the precursor solution has already begun.

In an embodiment of option (3) the total of the unacidified precursor solution is applied first and the total of the conversion agent is applied subsequently and either immediately after the unacidified precursor solution has been applied or after a short period of time.

In a further embodiment of option (3) the unacidified precursor solution and the conversion agent are applied intermittently beginning with the unacidified precursor solution. Unacidified precursor solution and the conversion agent may be applied immediately after each other or after a specific period of time.

Preferably, the amount of conversion agent used in the process of the invention is such that the precursor is in molar excess over the conversion agent. The molar ratio of precursor to conversion agent is in particular 2:1 to 10:1.

In an embodiment, the drying step (d) is carried out simultaneously with step (b) and/or step (c).

In a further embodiment, steps (b) to (d) can be carried out two or more times in order to obtain particles having a thicker coating.

In a further embodiment, step (d) is carried out at a temperature in the range from about 40° C. to about 120° C., preferably about 50° C. to about 100° C.

The spouted bed technology and, in particular, the fluidized bed technology for drying the particles in step (d) can be carried out in a conventional apparatus such as those commercially available from Glatt GmbH, 79589 Binzen, Germany. The drying conditions are selected such that the temperature of the particles is maintained in the range from 40° C. to 100° C., in particular 40° C. to 80° C. during the drying operation, i.e. the drying is done such that the exit temperature of the drying gas (normally air) is in the range from 40° C. to 80° C. To achieve this the supply gas temperature is, in general, selected in the range from 60° C. to 200° C., in particular 80° C. to 140° C. whereas the other parameters will have to be selected depending on the type and size of the apparatus and the batch size.

For feeding the reagents, conventional nozzles can be used such as a two-substance nozzle or a three-substance nozzle.

The coated particles are dried to a water content of 0.5% to 5% by weight.

Step (e)

After the drying of the coated particles is finished they are subjected to a heat treatment in the range from 100° C. to 1000° C. or 200° C. to 800° C. or 200° C. to 500° C. or 300° C. to 400° C. In one embodiment the heat-up rate is 1 to 5° C./min. In a further embodiment the heating time is from 0.5 h to 12 h or 1 h to 6 h or 1 h to 4 h or 2 h to 4 h. After the heat treatment the particles are cooled down. In an embodiment the cool down phase is from 0.5 h to 24 h or 0.5 h to 12 h or 1 h to 8 h or 2 h to 8 h or 4 h to 8 h. Any apparatus can be used for the heat-treatment, such as a rotary kiln or calciner, conveyor belt furnace, etc.

The invention also relates to silica coated particles which are obtainable according to the methods of the invention. They have a particle size d(50) in the range from about 50 µm to about 1000 µm, in particular from about 60 µm to about 300 µm and preferably from about 60 µm to about 200 µm, as determined by SLS. The silica coating is a protective coating which delays release of the expanding agent also in alkaline systems like cementitious systems. The release of the expanding agent is achieved by slow dissolution or chemical degradation of the silica in alkaline medium (pH≥10) such as in cementitious compositions or by permeation of water through the silica coat or by infiltration through imperfections of the coat such small cracks. Expansion of the expanding agent may also rupture the coat allowing a better contact of the expanding agent with water.

The release of the expanding agent may also be effected by the action of mechanical forces such as shearing forces. The delay in release of the expanding agent may range from 0.5 h to 48 h or 0.5 h to 24 h or 1 h to 16 h or 1 h to 12 h or 1 h to 8 h or 1 h to 4 h or 6 h to 12 h or 8 h to 10 h. The release of the expanding agent is also delayed at higher temperatures such as 40° C. to 100° C.

Depending on the amount of silica and the heat treatment temperature and time it is possible to design the properties of the particles according to the needs of the user. This means that the delay in release of the expanding agent can be controlled by the amount of coating and by the heat treatment. Within the above-mentioned boundaries it can be said that the higher the amount of coating and/or the longer the heating time, the slower the heating rate and the slower the cool down time, the longer is the delay of the release of the expanding agent. This means that the particles may be added into a cementitious composition prior to positioning and/or setting of the cement slurry without the risk of a premature release of the expanding agent. When the expanding agent is finally released it combines with water to form a hydrated product having a larger volume relative to the unhydrated expanding agent. Due to the higher volume of the expanding agent the volume of the set cement is increased so that small gaps and cracks in the set cement will be filled or at least reduced.

The invention further relates to compositions comprising the particles of the invention and a binder. In an embodiment the composition may be a cementitious composition or construction chemical composition comprising the particles of the invention and a hydraulic binder, such as cement. The cementitious composition may be in solid form or in the form of a cement slurry. Depending on the intended use the composition may comprise additives such as hardening accelerators, such as calcium silicate hydrate, retarders, dispersing agents etc. According to an embodiment, the composition is a building material composition which comprises a hydraulic binder such as cement, in particular OPC (ordinary Portland cement), high alumina cement, a latent hydraulic binder or a non-hydraulic binder such as gypsum, including α- and β-hemihydrate or anhydrite.

According to a further embodiment, the construction chemical composition comprises a geopolymer binder. The geopolymer binder may be selected from latent hydraulic binders, pozzolanic binders and/or alkali-activated aluminosilicate binders, and mixtures thereof.

The latent hydraulic binders may be selected from industrial or synthetic slags, for example blast furnace slag, granulated blast furnace slag, ground granulated blast furnace slag, slag sand, ground slag sand, electrothermic phosphorus slag, steel slag, and mixtures thereof, and the pozzolanic binders may be selected from amorphous silica, for example precipitated silica, pyrogenic silica and microsilica, finely ground glass, fly ash, for example brown-coal fly ash or mineral coal fly ash, metakaolin, natural pozzolans such as tuff, trass and volcanic ash, natural and synthetic zeolites, and mixtures thereof.

Aluminate cement ("high-alumina cement") comprises about 20% to 40% by weight CaO, up to about 5% by weight $SiO_2$, about 40% to 80% by weight $Al_2O_3$ and up to about 20% by weight $Fe_2O_3$.

The slags may be both industrial slags, i.e. waste products from industrial processes, and synthetically reproduced slags. The latter slags provide the advantage that they are always available in consistent quantity and quality.

A latent hydraulic binder may be a binder in which the molar ratio of (CaO+MgO):$SiO_2$ is of between 0.8 and 2.5, preferably between 1.0 and 2.0.

Blast furnace slag, a typical latent hydraulic binder, generally comprises 30% to 45% by weight CaO, about 4% to 17% by weight MgO, about 30% to 45% by weight $SiO_2$ and about 5% to 15% by weight $Al_2O_3$, for example about 40% by weight CaO, about 10% by weight MgO, about 35% by weight $SiO_2$ and about 12% by weight $Al_2O_3$. The cured products generally have the properties of hydraulically cured systems.

"Blast furnace slag" is a waste product of the blast furnace process. "Slag sand" is granulated blast furnace slag, and "ground granulated blast furnace slag" is finely pulverized slag sand. The ground slag sand varies, according to origin and processing form, in its particle size and grain-size distribution, with the particle size affecting the reactivity. As a characteristic variable for the particle size, the figure known as the Blaine value is employed, which is typically in the order of magnitude of 200 $m^2 kg^{-1}$ to 1000 $m^2 kg^{-1}$, preferably between 300 $m^2 kg^{-1}$ and 500 $m^2 kg^{-1}$.

Electrothermic phosphorus slag is a waste product from the production of phosphorus by electrothermic means. It is less reactive than blast furnace slag and comprises about 45% to 50% by weight CaO, about 0.5% to 3% by weight MgO, about 38% to 43% by weight $SiO_2$, about 2% to 5% by weight $Al_2O_3$ and about 0.2% to 3% by weight $Fe_2O_3$, and also fluoride and phosphate. Steel slag is a waste product from various steel manufacturing processes, with a highly varying composition (see Caijun Shi, Pavel V. Krivenko, Della Roy, Alkali-Activated Cements and Concretes, Taylor & Francis, London & New York, 2006, pp. 42-51).

Amorphous silica is preferably an X-ray-amorphous silica, i.e. a silica which exhibits no crystallinity in a powder diffraction procedure. The amorphous silica for example comprises $SiO_2$ in an amount of at least 80% by weight, preferably at least 90% by weight. Precipitated silica is obtained industrially via precipitation processes starting from water glass. Depending on the manufacturing method, precipitated silica is also called silica gel. Pyrogenic silica is generated by reacting chlorosilanes, such as silicon tetrachloride, in an oxyhydrogen flame. Pyrogenic silica is an amorphous $SiO_2$ powder with a particle diameter of 5 nm to 50 nm and a specific surface area of 50 $m^2 g^{-1}$ to 600 $m^2 g^{-1}$.

Microsilica is a by-product of silicon or ferrosilicon manufacture and comprises amorphous $SiO_2$ powder. The particles have diameters of about 0.1 μm. The specific surface area is about 15 $m^2 g^{-1}$ to 30 $m^2 g^{-1}$. In contrast, commercial silica sand is crystalline and has comparatively larger particles and a comparatively lower specific surface area.

Fly ashes are for example formed in operations including the combustion of coal in power stations. Class C fly ash (brown coal fly ash) comprises, according to WO 08/012438, about 10% by weight CaO, whereas class F fly ash (mineral coal fly ash) comprises less than 8% by weight, preferably less than 4% by weight, and typically about 2% by weight, CaO. Metakaolin may be formed in the dehydrogenation reaction of kaolin. Kaolin releases bound water at 100° C. to 200° C., dehydroxylation occurs at 500° C. to 800° C., with collapse of the lattice structure and formation of metakaolin ($Al_2Si_2O_7$). Pure metakaolin, accordingly, comprises about 54% by weight $SiO_2$ and about 46% by weight $Al_2O_3$.

Further pozzolanic binders are for example shown in Caijun Shi, Pavel V. Krivenko, Della Roy, Alkali-Activated Cements and Concretes, Taylor & Francis, London & New York, 2006, pp. 51-63. Testing for pozzolan activity can take place in accordance with DIN EN 196 Part 5.

The above-mentioned alkali-activated aluminosilicate binders may comprise latent hydraulic and/or pozzolanic binders as defined above and also alkaline activators, such as aqueous solutions of alkali metal carbonates, alkali metal fluorides, alkali metal hydroxides, alkali metal aluminates and/or alkali metal silicates, such as soluble water glass, magnesia cement, phosphate cement, or calcium oxide.

The construction chemical compositions may additionally contain additives such as glycols, polyalcohols, aminoalcohols, organic acids such as citric acid or tartaric acid, sugars, melasses, organic and inorganic salts, polycarboxylate ethers, naphthalene sulfonate, melamine-formaldehyde polycondensates, lignin sulfonate, as well as mixtures thereof. Further suitable additives are defoamers, water retention agents, pigments, fibers, dispersion powders, wetting agents, retarders, hardening accelerators, such as calcium silicate hydrate, complex forming agents, aqueous dispersions and rheology modifiers.

In a further embodiment, the construction chemical compositions may be selected from compositions for concretes such as on-site concrete, finished concrete parts, pre-cast concrete parts, concrete goods, cast concrete stones, concrete bricks, in-situ concrete, sprayed concrete (shotcrete), ready-mix concrete, air-placed concrete, concrete repair systems, industrial cement flooring, one-component and two-component sealing slurries, screeds, filling and (self)-levelling compositions, such as joint fillers or self-levelling underlayments, adhesives, such as building or construction adhesives, thermal insulation composite system adhesives, tile adhesives, renders, plasters, adhesives, sealants, coating and paint systems, in particular for tunnels, waste water drains, splash protection and condensate lines, screeds, such as anhydrite or hemihydrate or cement based screeds, mortars, such as dry mortars, sag resistant, flowable or self-levelling mortars, drainage mortars, or repair mortars, grouts, such as joint grouts, non shrink grouts, or wind-mill grouts, anchor grouts, EIFS grouts (Exterior Insulation Finishing Systems), or swelling explosives.

In a further embodiment, the construction chemical composition may be a well cementing composition or slurry comprising cement and the particles of the invention. They are useful for strengthening a well bore (oil well, gas well or water well), in particular for the exploration and/or recovery of oil, gas or water.

In a further embodiment, the composition comprises a binder which may be selected from polyurea silicate compositions. The polyurea silicate composition is obtainable by reacting a mixture comprising (i) at least one isocyanate component having at least two isocyanate groups per molecule, (ii) at least one alkali metal silicate, and (iii) water. These compositions are disclosed in WO 2014/096349 which is incorporated herein by reference in its entirety, in particular, page 2, 3$^{rd}$ paragraph to page 6, 3$^{rd}$ paragraph, page 7, full paragraphs 1 to 3 and the claims. Construction chemical compositions comprising said polyurea silicate composition are useful for strengthening a well bore (oil well, gas well or water well), in particular for the exploration and/or recovery of oil, gas or water. The construction chemical compositions are further useful for coatings, adhesives, sealants, flooring, and injection resins.

In a further embodiment, the composition comprises polymer dispersions as a binder. Such compositions are useful for coatings and adhesives.

In an embodiment, the expanding agent is present in the composition at a concentration greater than or equal to about 0.1 weight percent based on the total weight of hydraulic cement present, or greater than or equal to about 0.5 weight percent, or greater than or equal to about 1 weight percent, and less than or equal to about 25 weight percent, or less than or equal to about 20 weight percent, or less than or equal to about 15 weight percent, or less than or equal to about 10 weight percent, or less than or equal to about 5 weight percent, based on the weight of hydraulic cement present. For example, the slurry may comprise from 0.1 to 20 weight percent of the coated particles, or from 0.5 to 10 weight percent of the coated particles, or from 1 to 5 weight percent of the coated particles, based on the weight of the hydraulic cement.

A further embodiment is a method to cement a subterranean well having a borehole disposed through a formation, comprising: (i) preparing a cement slurry comprising water, hydraulic cement, and the coated particles of the invention and combining the capsules with water and hydraulic cement; (ii) placing the slurry in an annular region of the well around a tubular body; (iii) hardening the slurry to form an at least partially set cement; and (iv) hydrating the expanding agent to form an expanded set cement within the annular region. In embodiments, the method further comprises forming bonds between the expanded set cement, the tubular body and a wall of the borehole, and/or isolating a zone of the formation adjacent the expanded set cement.

The invention also relates to the use of the particles of the invention for preparing a well cementing slurry by combining the particles with water and cement.

In accordance with the above, the invention provides the following embodiments:

1. A process for preparing silica-coated particles of an inorganic expanding agent which comprises the steps of
   (a) providing particles of an inorganic expanding agent,
   (b) contacting the particles of the inorganic expanding agent with an aqueous solution or dispersion of a silica precursor to form particles which are at least partially coated,
   (c) converting the silica precursor to silica,
   (d) drying the coated particles, and
   (e) subjecting the coated particles to a heat treatment.

2. The process of embodiment 1, wherein the inorganic expanding agent is selected from calcium oxide, magnesium oxide, strontium oxide, barium oxide, calcium sulfate hemihydrate, anhydrite, sodium sulfate, magnesium sulfate, phyllosilicates, such as bentonite, montmorillonite, smectite, nontronite, beidellite, perlite or vermiculite, silicates which are obtained by reaction of alkalis with siliceous aggregates such as quartz, cement phases and mixtures of two or more thereof and mixed oxides of said oxide expanding agents; preferably the inorganic expanding agent is selected from calcium oxide, magnesium oxide, strontium oxide, barium oxide, calcium sulfate hemihydrate, anhydrite, sodium sulfate, magnesium sulfate, and phyllosilicates, such as bentonite, montmorillonite, smectite, nontronite, beidellite, perlite or vermiculite.

3. The process of embodiment 2, wherein the inorganic expanding agent is selected from calcium oxide, magnesium oxide, strontium oxide, barium oxide, calcium sulfate hemihydrate, anhydrite, bentonite, and montmorillonite and mixtures of two or more thereof and mixed oxides of said oxide expanding agents.

4. The process of embodiment 3, wherein the inorganic expanding agent is selected from calcium oxide, magnesium oxide, mixtures of calcium oxide and magnesium oxide and mixed oxides thereof.

5. The process of embodiment 4, wherein the inorganic expanding agent is calcium oxide.

6. The process of embodiment 4, wherein the inorganic expanding agent is magnesium oxide.
7. The process of embodiment 4, wherein the inorganic expanding agent is a mixture of calcium oxide and magnesium oxide and mixed oxides thereof.
8. The process of embodiment 7, wherein calcium oxide and magnesium oxide are used in a molar mixing ratio of 1:100 to 100:1, or 1:20 to 20:1 or 1:10 to 10:1 or 1:5 to 5:1.
9. The process of any one of the preceding embodiments, wherein the expanding agent is used in powder form.
10. The process of any one of the preceding embodiments, wherein the particles of the inorganic expanding agent of step (a) have a particle size d(50) in the range from about 1 µm to about 100 µm, preferably in the range from about 10 µm to about 90 µm, and in particular from about 20 µm to about 60 µm.
11. The process of any one of the preceding embodiments, wherein the expanding agent has a polymodal particle size distribution.
12. The process of any one of the preceding embodiments, wherein the silica precursor is converted to silica by contacting with a conversion agent.
13. The process of any one of the preceding embodiments, wherein the silica precursor is a water-soluble alkali metal silicate having a solubility of ≥100 g alkali metal silicate per 1 L water.
14. The process of embodiment 13, wherein the alkali metal silicate is selected from compounds having the empirical formula m $SiO_2 \cdot nM_2O$, where M stands for Li, Na, K and $NH_4$, or mixtures thereof, preferably for Na and K.
15. The process of embodiment 14, wherein the molar ratio m:n is 0.5 to 4.0, preferably 1.0 to 4.0 and more particularly 2.0 to 4.0 or 2.6 to 4.0.
16. The process of any one of embodiments 13 to 15, wherein the alkali metal silicate is a liquid water glass, and more particularly a sodium or potassium water glass or a mixture thereof.
17. The process of any one of the preceding embodiments, wherein the silica precursor is used in an amount such that the weight ratio of inorganic expanding agent to silica is in the range from 15:1 to 1:2, preferably from 10:1 to 1:1.
18. The process of any one of embodiments 13 to 17, wherein the conversion agent is a water-soluble inorganic or organic acid having a pKa of ≤5.
19. The process of embodiment 18, wherein the acid is selected from hydrochloric acid, hydrobromic acid, sulfuric acid, phosphoric acid, nitric acid, methane sulfonic acid, toluene sulfonic acid, benzene sulfonic acid, formic acid, acetic acid and in particular from hydrochloric acid and methane sulfonic acid.
20. The process of any one of the preceding embodiments, wherein the particles of the inorganic expanding agent are contacted with the solution or dispersion of the silica precursor in a fluidized bed or spouted bed apparatus.
21. The process of embodiment 20, wherein the particles of the inorganic expanding agent are placed into the fluidized bed or spouted bed apparatus and the apparatus is put into operation so that the particles adopt the operation temperature.
22. The process of embodiment 21, wherein the solution or dispersion of the silica precursor is sprayed into the fluidized bed or spouted bed apparatus.
23. The process of embodiment 22, wherein the conversion agent is sprayed simultaneously with the solution or dispersion of the silica precursor into the fluidized bed or spouted bed apparatus.
24. The process of embodiment 22, wherein the conversion agent is sprayed subsequently to or intermittently with the solution or dispersion of the silica precursor into the fluidized bed or spouted bed apparatus.
25. The process of embodiment 22, wherein the silica precursor is a silicate solution as defined in embodiments 13 to 17 and the total of the conversion agent is added to the silicate solution prior to spraying it into the fluidized bed or spouted bed apparatus.
26. The process of embodiment 22, wherein the silica precursor is a silicate solution as defined in embodiments 13 to 17 and a part of the conversion agent is added to the silicate solution prior to spraying it into the fluidized bed or spouted bed apparatus to give a further silica precursor.
27. The process of embodiment 26, wherein the amount of the conversion agent added to the silicate solution is such that the pH of the further silica precursor solution is in the range from 10 to 12.
28. The process of embodiment 26 or 27, wherein the further silica precursor is sprayed into the fluidized bed or spouted bed apparatus and the remainder of the conversion agent is sprayed into the fluidized bed or spouted bed apparatus simultaneously or subsequently or intermittently.
29. The process of any one of the preceding embodiments, wherein steps (b) to (d) are carried out simultaneously.
30. The process of any one of embodiments 20 to 29, wherein the drying conditions are selected such that the temperature of the particles is maintained in the range from 40° C. to 100° C., in particular 40° C. to 80° C., during the drying operation.
31. The process of any one of the preceding embodiments, wherein the heat treatment is carried out at a temperature in the range from 100° C. to 1000° C.
32. The process of embodiment 31, wherein the temperature is in the range from 200° C. to 800° C.
33. The process of embodiment 31, wherein the temperature is in the range from 200° C. to 500° C.
34. The process of embodiment 31, wherein the temperature is in the range from 300° C. to 400° C.
35. The process of any one of the preceding embodiments, wherein in the heat treatment step (e) a heat up rate in the range from 1° C./min to 5° C./min is applied.
36. The process of any one of the preceding embodiments, wherein the heating time in step (e) is from 0.5 h to 12 h.
37. The process of embodiment 36, wherein the heating time is from 1 h to 6 h.
38. The process of embodiment 36, wherein the heating time is from 1 h to 4 h.
39. The process of embodiment 36, wherein the heating time is from 2 h to 4 h.
40. The process of any one of the preceding embodiments, wherein the heat treatment step (e) includes a cool down phase.
41. The process of embodiment 40, wherein the cool down phase is from 0.5 h to 24 h or 0.5 h to 12 h.
42. The process of embodiment 40, wherein the cool down phase is from 1 h to 8 h.
43. The process of embodiment 40, wherein the cool down phase is from 2 h to 8 h.
44. Silica-coated particles of an inorganic expanding agent obtainable by a process of any one of embodiments 1 to 43.
45. The particles of embodiment 44 having a particle size d(50) in the range from about 50 µm to about 1000 µm, in particular from about 60 µm to about 300 µm, as determined by SLS.

46. The particles of embodiment 44 or 45, wherein the coating has a thickness in the range from about 0.5 μm to about 10 μm.

47. The particles of embodiment 45 having a particle size d(50) in the range from about 60 μm to about 200 μm, as determined by SLS.

48. The particle of any one of embodiments 44 to 47 providing a delay in release of the expanding agent in the range from 0.5 h to 48 h or 0.5 h to 24 h or 1 h to 16 h or 1 h to 12 h.

49. The particle of embodiment 48 providing a delay in release of the expanding agent in the range from 6 h to 12 h or 8 h to 10 h.

50. A construction chemical composition comprising the particles of any one of embodiments 44 to 49 and a binder.

51. The composition of embodiment 50, wherein the binder is a hydraulic binder.

52. The composition of embodiment 51, wherein the binder is cement, in particular OPC (ordinary Portland cement), high alumina cement, sulfoaluminate cement or a latent hydraulic binder or mixtures thereof.

53. The composition of embodiment 51, wherein the binder is a geopolymer binder.

54. The composition of embodiment 53, wherein the geopolymer binder is selected from latent hydraulic binders, pozzolanic binders and alkali-activated aluminosilicate binders, and mixtures thereof.

55. The composition of embodiment 54, wherein the latent hydraulic binder is selected from blast furnace slag, granulated blast furnace slag, ground granulated blast furnace slag, slag sand, ground slag sand, electrothermic phosphorus slag, steel slag, and mixtures thereof.

56. The composition of embodiment 54, wherein the pozzolanic binder is selected from amorphous silica, for example precipitated silica, pyrogenic silica and microsilica, finely ground glass, fly ash, for example brown-coal fly ash or mineral coal fly ash, metakaolin, natural pozzolans such as tuff, trass and volcanic ash, natural and synthetic zeolites, and mixtures thereof.

57. The composition of any one of embodiments 50 to 56 in the form of building material formulations and/or building products for concretes such as on-site concrete, finished concrete parts, pre-cast concrete parts, concrete goods, cast concrete stones, concrete bricks, in-situ concrete, sprayed concrete (shotcrete), ready-mix concrete, air-placed concrete, concrete repair systems, industrial cement flooring, one-component and two-component sealing slurries, screeds, filling and (self)-levelling compositions, such as joint fillers or self-levelling underlayments, adhesives, such as building or construction adhesives, thermal insulation composite system adhesives, tile adhesives, renders, plasters, adhesives, sealants, coating and paint systems, in particular for tunnels, waste water drains, splash protection and condensate lines, screeds, such as anhydrite or hemihydrate or cement based screeds, mortars, such as dry mortars, sag resistant, flowable or self-levelling mortars, drainage mortars, or repair mortars, grouts, such as joint grouts, non shrink grouts, or wind-mill grouts, anchor grouts, EIFS grouts (Exterior Insulation Finishing Systems), or swelling explosives.

58. The composition of any one of embodiments 50 to 57 in the form of a well cementing composition or slurry.

59. The composition of any one of embodiments 50 to 58 comprising at least 0.1 wt.-% of the particles, based on the amount of binder.

60. The composition of embodiment 59 comprising 0.1 wt.-% to 20 wt.-% of the particles, based on the amount of binder.

61. The composition of embodiment 60 comprising 0.5 wt.-% to 10 wt.-% of the particles, based on the amount of binder.

62. The composition of embodiment 60 comprising 5 wt.-% to 10 wt.-% of the particles, based on the amount of binder.

63. The composition of any one of embodiments 50 to 62 in the form of a dry blend or in the form of an aqueous slurry.

64. The composition of any one of embodiments 50 to 63, additionally comprising a polyurea silicate composition.

65. The composition of embodiment 64, wherein the polyurea silicate composition is obtainable by reacting a mixture comprising (i) at least one isocyanate component having at least two isocyanate groups per molecule, (ii) at least one alkali metal silicate, and (iii) water.

66. The composition of embodiment 65, wherein the at least one alkali metal silicate has a modulus m of from 2 to 4, preferably 2.3 to 3.5, wherein m=$SiO_2/M_2O$, and wherein M is Na, K or Li.

67. The composition of any one of embodiments 65 to 66, wherein the mixture further comprises at least one of a catalyst, an emulsifying agent, and a filler.

68. The composition of embodiment 67, wherein the catalyst is selected from at least one compound comprising at least one amine functional group, preferably a tertiary amine functional group, and organometallic catalysts.

69. The composition of any one of embodiments 67 or 68, wherein the emulsifying agent is a non-ionic emulsifying agent.

70. The composition of any one of embodiments 67 to 69, wherein the filler is an inorganic material.

The following examples illustrate the invention without limiting it.

Test Methods:

The expansion test for concrete was carried out in accordance with DIN EN ISO 10426-5 by making a well cement slurry including 10% by weight of cement (bwoc) of the particles of the invention, 0.5% (bwoc) Liquiment K3F (dispersant, sulfonated acetone resin), 0.6% bwoc Polytrol FL34 (fluid loss additive, modified polyacrylamide) and a small amount<0.1% by volume defoamer (e.g. tri-isobutylphosphate).

Quick test for determining the expansion of the particles of the invention and of the delay of release of the expanding agent:

3 g of the particles to be tested are placed in glass containers having a diameter of 2 cm and a height of about 8 cm. The particles are then dispersed in 10 ml of a 1 M NaOH by shaking and allowed to settle. The height of the sediment is determined. Thereafter, the particles are allowed to expand at 60° C. The height of the expanded particles is measured after a predetermined period of time (for example after 4, 6 or 8 h).

SLS=Static Light Scattering:

The particle size d(50) is determined using a Malvern Mastersizer 2000 (Malvern Instruments GmbH, Germany). The software utilized for measurement and evaluation is the Malvern software package belonging to the instrument. The measurement principle is based on laser diffraction by measuring the intensity of light scattered as a laser beam passes through a particulate sample. This data is then analyzed to calculate the size of the particles that created the scattering pattern.

EXAMPLES

In the examples the following water glasses were used:
Sodium water glass
NaSi 40/42: 8.8% $Na_2O$, 29.5% $SiO_2$ and 61.7% $H_2O$; modulus 3.4; solids content 38.3%.
NaSi 37/40: 8% $Na_2O$, 26.8% $SiO_2$ and 65.2% $H_2O$; modulus 3.4; solids content 34.8%.
NaSi 50/52: 13.8% $Na_2O$, 33.5% $SiO_2$ and 52.7% $H_2O$; modulus 2.4; solids content 47.3%.
Potassium water glass (abbreviated as KSi 40 EM) containing 12.8% $K_2O$, 26.8% $SiO_2$ and 60.4% by weight $H_2O$; modulus 3.3; solids content 39.6%.

If said abbreviations are followed by a percent value, this means that the water glass was diluted with water. For example, NaSi 75% means that 75 parts of the water glass solution were diluted with 25 parts of water.

1. Silica Precursor Prepared by Addition of the Total Amount of Conversion Agent (Acid) to the Initial Silica Precursor 75 parts of NaSi 40/42 were diluted with 25 parts of water with stirring. To the obtained solution methane sulfonic acid (MSA) in the concentrations and amounts as given in table 1 below was added slowly with vigorous stirring to give a silica precursor solution. The process was repeated with other concentrations and other acids. The data are given in tables 1 and 2 below.

The CaO/MgO particles (mixture in a molar ratio of 1:1) used here had a particle size d(50) of 40 μm. They were placed into a pilot fluidized bed apparatus in which the particles were heated to 65° C. A silica precursor solution was then sprayed onto the particles (air inlet temperature: 120° C.; outlet temperature: 65° C.; gas volume: 40-45 m³/h; drying gas velocity: 0.8-0.9 m/s; nozzle gas volume: 4-6.5 m³/h; nozzle pressure: 3.3 bar). The dried particles had a water content of <1% by weight. The data are given in table 3 below.

TABLE 1

| Example | CaO/MgO | water glass solution | $SiO_2$ | acid/molarity | acid solution |
|---|---|---|---|---|---|
| 1 | 2 kg | 2500 g | 488 g | MSA/0.5M | 1875 g |
| 2 | 2 kg | 1250 g | 244 g | MSA/0.5M | 938 g |
| 3 | 2 kg | 2500 g | 488 g | MSA/0.75M | 2500 g |
| 4 | 2 kg | 1875 g | 366 g | MSA/0.5M | 1406 g |
| 5 | 2 kg | 1600 g | 323 g | HCl/0.25M | 3200 g |
| 6 | 2 kg | 1600 g | 323 g | $HNO_3$/0.5M | 900 g |
| 7 | 2 kg | 1600 g | 323 g | acetic acid/1M | 160 g |
| 8 | 2 kg | 2133 g[1] | 443 g | HCl/0.5M | 2133 g |
| 9 | 2 kg | 2400 g[2] | 504 g | HCl/0.5M | 2400 g |

[1] KSi 40EM/NaSi 40/42 (1:3) 75%
[2] NaSi 40/42

TABLE 2

| Example | CaO/MgO in kg | water glass solution | NaSi in g | HCl in g | coating in g | relative |
|---|---|---|---|---|---|---|
| 10 | 2 | NaSi 40/42 75% + 0.5M HCl | 2375 | 2375 | 499 | 25% |
| 11 | 2 | NaSi 40/42 75% + 0.5M HCl | 2375 | 2375 | 499 | 25% |

TABLE 3

| Example | CaO in g | water glass solution | conc. | solution in g | coating in g | coating relative | active relative | acid/molarity | g acid |
|---|---|---|---|---|---|---|---|---|---|
| 12 | 1700 | KSi 40EM/NaSi 40/42 (1:3) 75% | 28.1% | 2500 | 701 | 41.25% | 67% | HCl/0.5M | 2000 |
| 13 | 2000 | KSi 40EM/NaSi 40/42 (1:3) 75% | 28.1% | 3500 | 982 | 49.09% | 67% | HCl/0.5M | 2750 |
| 14 | 2000 | KSi 40EM/NaSi 40/42 (1:3) 75% | 28.1% | 3000 | 842 | 42.08% | 70% | HCl/0.5M | 2750 |

2. Silica Precursor Prepared by Addition of a Part of the Conversion Agent (Acid) to the Initial Silica Precursor A water glass solution was prepared as described above. To this solution the amount of acid was added as given in table 4 below, column "g acid", with vigorous stirring. This solution was sprayed onto the expanding agent as described above. Thereafter, a second part of the acid as given in table 4, column "$2^{nd}$ part of acid" was sprayed onto the particles under the same conditions. The data are given in table 4 below. A further series of experiments was carried out under varied conditions. The data are given in tables 5 and 6 below.

TABLE 4

| Example | CaO/MgO | water glass solution | solid cont. | water glass in g | coating in g | coating relative | g $SiO_2$ | active relative | acid/molarity | g acid | 2nd part of acid mol HCl | 2nd part of acid g (HCl) |
|---|---|---|---|---|---|---|---|---|---|---|---|---|
| 15 | 3000 g | KSi 40EM/NaSi 40/42 (1:3) 75% | 28.1% | 2000 | 562 | 19% | 415 | 84% | HCl/0.5M | 1833 | 1 | 2000 |
| 16 | 3000 g | KSi 40EM/NaSi 40/42 (1:3) 75% | 28.1% | 2950 | 829 | 28% | 612 | 78% | HCl/0.5M | 2750 | 1 | 2000 |
| 17 | 3000 g | NaSi 40/42 (75%) | 27.6% | 5900 | 1628 | 54% | 1239 | 63% | HCl/0.5M | 5500 | 1 | 4000 |

TABLE 4-continued

| Example | CaO/ MgO | water glass solution | solid cont. | water glass in g | coating in g | coating relative | g SiO$_2$ | active relative | acid/ molarity | g acid | 2nd part of acid mol HCl | g (HCl) |
|---|---|---|---|---|---|---|---|---|---|---|---|---|
| 18 | 3000 g | NaSi 40/42 (75%) | 27.6% | 2950 | 814 | 27% | 620 | 79% | HCl/0.5M | 2750 | 1 | 2000 |
| 19 | 3000 g | NaSi 40/42 (75%) | 27.6% | 1475 | 407 | 14% | 310 | 88% | HCl/0.5M | 1375 | 1 | 1000 |
| 20 | 3000 g | NaSi 40/42 (75%) | 27.6% | 5900 | 1628 | 54% | 1239 | 65% | HCl/0.5M | 5500 | 1 | 1000 |
| 21 | 3000 g | NaSi 40/42 (75%) | 27.6% | 5900 | 1628 | 54% | 1239 | 65% | HCl/0.5M | 5500 | 1 | 4000 |

TABLE 5

| Example | CaO/ MgO | water glass solution | solids content | water glass in g | coating in g | coating relative | g SiO$_2$ | active relative | acid/ molarity | g acid | 2nd part of acid M | g | acid |
|---|---|---|---|---|---|---|---|---|---|---|---|---|---|
| 22 | 2000 g | NaSi40/42 (75%) | 27.6% | 2850 | 787 | 39.33% | 599 | 72% | HCl/0.5M | 1375 | 1 | 1000 | HCl |
| 23 | 2000 g | NaSi40/42 (75%) | 27.6% | 4300 | 1187 | 59.34% | 903 | 63% | HCl/0.5M | 2075 | 1 | 1500 | HCl |
| 24 | 3000 g | NaSi40/42 (75%) | 27.6% | 2850 | 787 | 26.22% | 599 | 79% | HCl/0.5M | 2600 | 1 | 2000 | HCl |
| 25 | 3000 g | NaSi40/42 (75%) | 27.6% | 4300 | 1187 | 39.56% | 903 | 72% | HCl/0.5M | 3900 | 1 | 2000 | HCl |
| 26 | 3000 g | NaSi40/42 (75%) | 27.6% | 2150 | 593 | 19.78% | 452 | 83% | HCl/0.5M | 1950 | 1 | 1000 | HCl |
|  |  | NaSi40/42 (75%) | 27.6% | 2150 | 593 | 39.56% | 452 | 72% | HCl/0.5M | 1950 | 1 | 1500 | HCl |
| 27 | 3000 g | NaSi50/52 (75%) | 35.3% | 3650 | 1287 | 42.89% | 909 | 70% | HCl/0.5M | 2500 | 1 | 2500 | HCl |
| 28 | 3000 g | NaSi37/40 (75%) | 27.0% | 4300 | 1161 | 38.70% | 871 | 72% | MSA/0.5M | 2000 | 1 | 2000 | MSA |
| 29 | 3000 g | NaSi37/40 (75%) | 27.0% | 2750 | 743 | 24.75% | 557 | 80% | acetic acid/0.5M | 500 | 1 | 1000 | acetic acid |

TABLE 6

| Example | CaO/ MgO | water glass solution | solids content | water glass in g | coating in g | coating relative | g SiO$_2$ | active relative | acid/ molarity | g acid | 2nd part of acid M | g | acid |
|---|---|---|---|---|---|---|---|---|---|---|---|---|---|
| 30 | 2000 g | NaSi 37/40 (75%) | 27.0% | 1000 | 270 | 13.50% | 210 | 88% | HCl/0.5M | 900 | 1 | 1000 | HCl |
| 31 | 2000 g | NaSi 37/40 (75%) | 27.0% | 1000 | 270 | 13.50% | 210 | 88% | HCl/0.5M | 900 | 1 | 1000 | HCl |
| 32 | 2000 g | NaSi 37/40 (75%) | 27.0% | 2000 | 540 | 27.00% | 420 | 79% | HCl/0.5M | 1800 | 1 | 1500 | HCl |
| 33 | 2000 g | NaSi 37/40 (75%) | 27.0% | 2000 | 540 | 27.00% | 420 | 79% | HCl/0.5M | 1800 | 1 | 1500 | HCl |
| 34 | 2000 g | NaSi 37/40 (75%) | 27.0% | 2000 | 540 | 27.00% | 420 | 79% | formic acid/0.5M | 1800 | 1 | 1500 | acetic acid |
| 35 | 2000 g | NaSi 37/40 (75%) | 27.0% | 2000 | 540 | 27.00% | 420 | 79% | MSA/0.5M | 1800 | 1 | 1500 | MSA |
| 36 | 2000 g | NaSi 37/40 (75%) | 27.0% | 2000 | 540 | 27.00% | 420 | 79% | MSA/0.5M | 1800 | 1 | 1500 | MSA |

In FIG. 1 a schematic diagram of the coated particles without heat-treatment is shown. The calcium and magnesium oxide particles are dispersed throughout a silica matrix.

3. Heat Treatment of the Coated Particles

Example 37

The particles of the examples indicated in table 7 below were placed into ceramic crucibles and heated in a muffle furnace. The particles were heated within 2 h to the selected temperature (300° C., 350° C., 400° C., and 450° C.). The selected temperature was maintained for 3 h and thereafter the particles were allowed to cool to room temperature within 3 h.

The obtained particles were tested using the quick test for determining the expansion of the particles of the invention. The results are shown in table 7 below.

TABLE 7

| | 300° C. | | | 350° C. | | | 400° C. | | | 450° C. | | |
|---|---|---|---|---|---|---|---|---|---|---|---|---|
| | Example | | | | | | | | | | | |
| | 50 (300° C.) | 47 (300° C.) | 48 (300° C.) | 50 (350° C.) | 47 (350° C.) | 48 (350° C.) | 50 (400° C.) | 47 (400° C.) | 48 (400° C.) | 50 (450° C.) | 47 (450° C.) | 48 (450° C.) | Blank |
| Height at t = 0 h | 6 | 6 | 6 | 6 | 5 | 5 | 6 | 6 | 6 | 6 | 6 | 6 | 7 |
| Height at t = 2 h | 6 | 6 | 6 | 6 | 5 | 5 | 6 | 6 | 6 | 14 | 11 | 10 | 15 |
| Height at t = 4 h | 6 | 6 | 6 | 7 | 5 | 5 | 7 | 6 | 6 | 19 | 19 | 18 | 17 |
| Height at t = 6 h | 9 | 7 | 6 | 13 | 6 | 6 | 15 | 14 | 10 | 21 | 21 | 20 | 17 |
| Height at t = 8 h | 11 | 9 | 7 | 16 | 12 | 10 | 18 | 18 | 13 | 23 | 23 | 21 | 17 |
| Height at t = 24 h | 25 | 24 | 21 | 23 | 20 | 19 | 25 | 23 | 20 | 25 | 24 | 23 | 18 |
| $E = h_0/h_0$ | 1.0 | 1.0 | 1.0 | 1.0 | 1.0 | 1.0 | 1.0 | 1.0 | 1.0 | 1.0 | 1.0 | 1.0 | 1.0 |
| $E = h_2/h_0$ | 1.0 | 1.0 | 1.0 | 1.0 | 1.0 | 1.0 | 1.0 | 1.0 | 1.0 | 2.3 | 1.8 | 1.7 | 2.1 |
| $E = h_4/h_0$ | 1.0 | 1.0 | 1.0 | 1.2 | 1.0 | 1.0 | 1.2 | 1.0 | 1.0 | 3.2 | 3.2 | 3.0 | 2.4 |
| $E = h_6/h_0$ | 1.5 | 1.2 | 1.0 | 2.2 | 1.2 | 1.2 | 2.5 | 2.3 | 1.7 | 3.5 | 3.5 | 3.3 | 2.4 |
| $E = h_8/h_0$ | 1.8 | 1.5 | 1.2 | 2.7 | 2.4 | 2.0 | 3.0 | 3.0 | 2.2 | 3.8 | 3.8 | 3.5 | 2.4 |
| $E = h_{24}/h_0$ | 4.2 | 4.0 | 3.5 | 3.8 | 4.0 | 3.8 | 4.2 | 3.8 | 3.3 | 4.2 | 4.0 | 3.8 | 2.6 |

Example 38

Figure 2A:
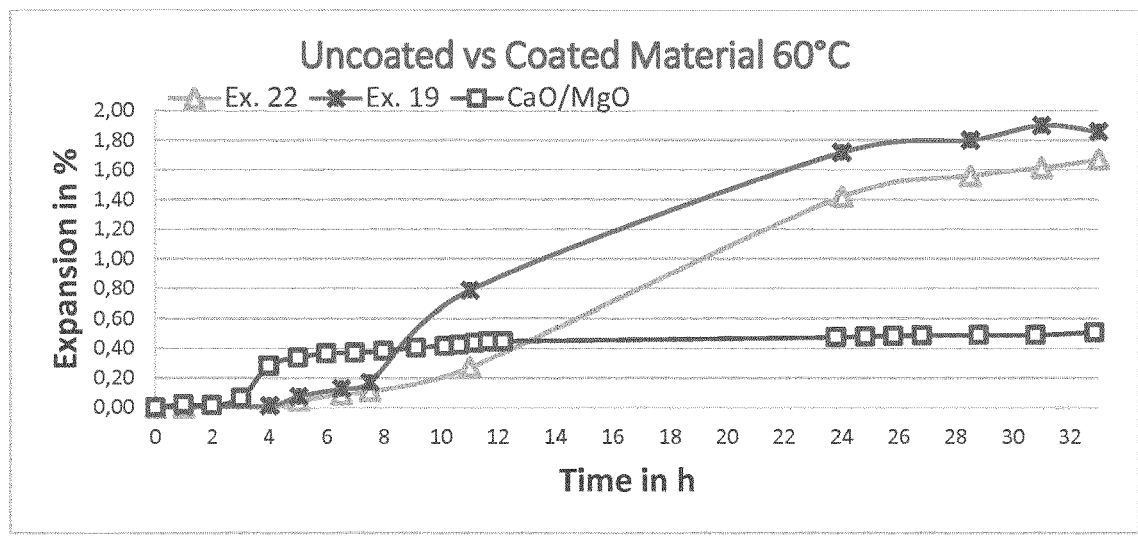
FIG. 2a shows the results of an expansion test of the uncoated particles vs. two different coated particles.

The particles of examples 19 and 22 were heat treated as described in example 37 at 350° C. and then subjected to the expansion test for concrete at 60° C. in accordance with DIN EN ISO 10426-5. For comparative purposes the expansion of uncoated CaO/MgO was determined under the same conditions. The results of the expansion tests are shown in FIG. 2a.

Example 39

Figure 2B:
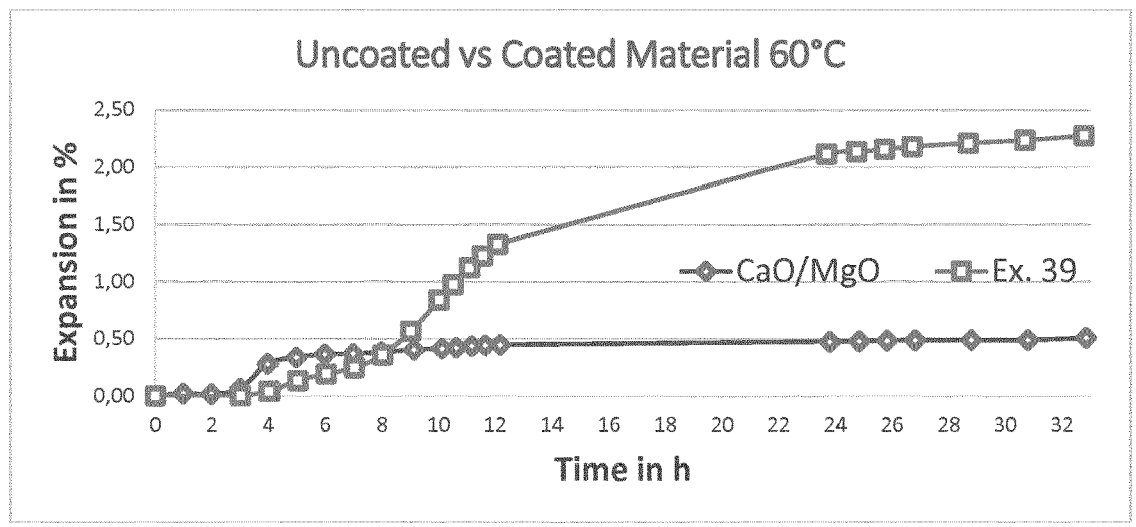
FIG. 2b shows the results of an expansion test of the uncoated particle vs a coated particle.

In a further experiment the particles of example 19 were heat treated as described in example 37 with the exception that they were allowed to cool down for 5 h. The heat treated particles were then subjected to the expansion test for concrete at 60° C. in accordance with DIN EN ISO 10426-5. For comparative purposes the expansion of uncoated CaO/MgO was determined under the same conditions. The results of the expansion tests are shown in FIG. 2b.

As can be seen, the expansion of the coated calcium oxide/magnesium oxide particles of the invention is significantly delayed as compared to the uncoated calcium oxide/magnesium oxide particles. Moreover, the expansion of the particles of the invention is significantly higher as compared to the uncoated particles.

Figure 3A:
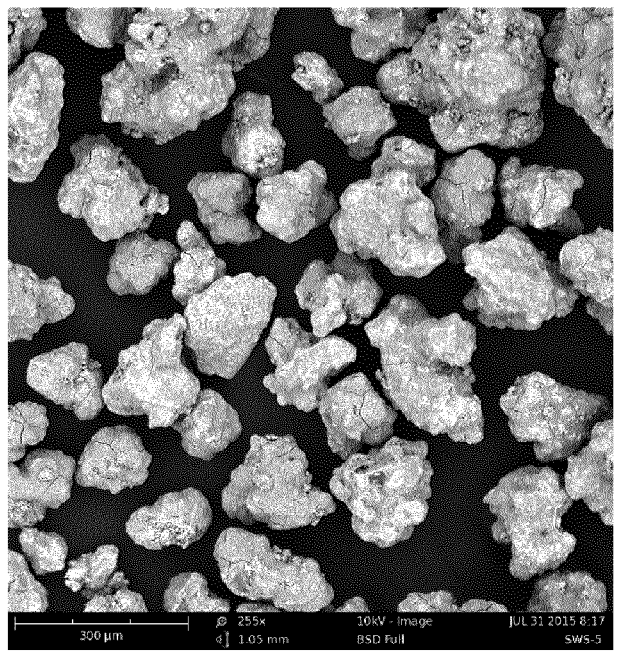
FIG. 3a is a SEM view on the coated but not heat-treated particles.
Figure 3B:
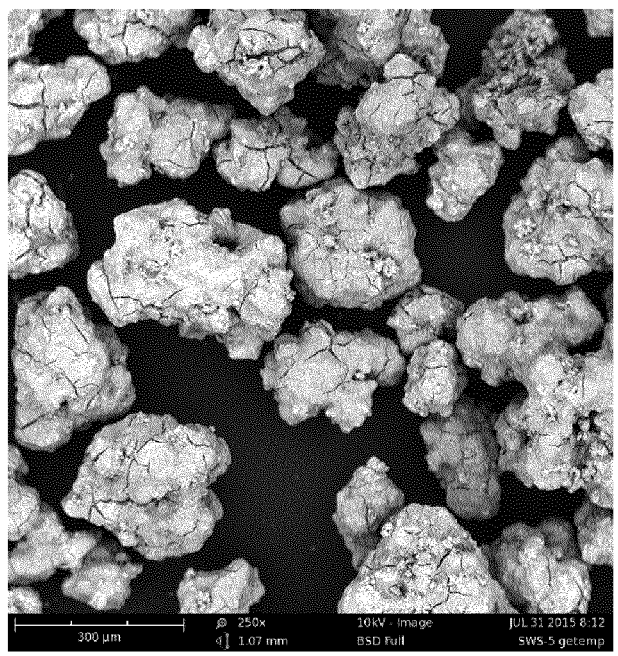
FIG. 3b is a SEM view on the coated and heat-treated particles.

FIG. 3a shows a SEM view on the coated particles of example 17 without heat-treatment whereas FIG. 3b shows the particles after heat-treatment. The cracks on the surface of the heat-treated particles facilitate the permeation of water or alkaline media through the silica.

The invention claimed is:

1. A process for preparing silica-coated particles of an inorganic expanding agent which comprises the steps of
   (a) providing particles of at least one inorganic expanding agent selected from the group consisting of calcium oxide, magnesium oxide, strontium oxide, barium oxide, mixed oxides of calcium, magnesium, strontium, and/or barium, calcium sulfate hemihydrate, anhydrite, sodium sulfate, magnesium sulfate, and phyllosilicates, and which has a particle size d(50), as determined by static light scattering, in the range from about 1 μm to about 100 μm,
   (b) contacting the particles of the inorganic expanding agent with an aqueous solution or dispersion of a silica precursor to form particles which are at least partially coated,
   (c) converting the silica precursor to silica,
   (d) drying the coated particles, and
   (e) subjecting the coated particles to a heat treatment;
   wherein the coated particles are subjected to a heat treatment at a temperature in the range from about 100° C. to about 1000° C.

2. The process of claim 1, wherein the inorganic expanding agent is selected from the group consisting of calcium oxide, magnesium oxide, and a mixture of calcium oxide and magnesium oxide.

3. The process of claim 1, wherein the particle size d(50) of the particles of step (a) is in the range from about 10 μm to about 90 μm.

4. The process of claim 1, wherein the particle size d(50) of the particles of step (a) is in the range from about 20 μm to about 60 μm.

5. The process of claim 1, wherein the silica precursor is converted to silica by contacting with a conversion agent.

6. The process of claim 5, wherein the inorganic expanding agent is contacted with the silica precursor and subsequently, simultaneously or intermittently with the conversion agent.

7. The process of claim 5, wherein a part of the conversion agent is added to the silica precursor prior to applying the silica precursor to the particles of the inorganic expanding agent and the remainder of the conversion agent is applied simultaneously with the silica precursor or subsequently.

8. The process of claim 1, wherein the drying step (d) is carried out simultaneously with step (b) and/or step (c).

9. The process of claim 1, wherein a fluidized bed or spouted bed apparatus is used for drying the particles.

10. The process of claim 1, wherein the silica precursor is water glass.

11. The process of claim 1, wherein the silica precursor is an alkali metal silicate.

12. The process of claim 11, wherein the conversion of the silica precursor is achieved by using an aqueous solution of an inorganic or organic acid as a conversion agent.

13. The process of claim 1, wherein the heat treatment is followed by a cool-down phase of 0.5 h to 24 h.

14. The process of claim 1, wherein the coated particles are subjected to a heat treatment at a temperature in the range from about 200° C. to about 500° C.

15. Silica-coated particles of an inorganic expanding agent obtained by the process of claim 1.

16. The particles of claim 15 having a particle size d(50) in the range from about 50 μm to about 1000 μm.

17. The particles of claim 15, wherein the coating has a thickness in the range from about 0.5 μm to about 10 μm.

18. The particles of claim 15, wherein the weight ratio between inorganic expanding agent and the silica is in the range from 15:1 to 1:2.

19. A constituent of a building material formulation comprising the particles of claim 15 wherein the building material formulation is on-site concrete, finished concrete parts, pre-cast concrete parts, concrete goods, cast concrete stones, concrete bricks, in-situ concrete, sprayed concrete (shotcrete), ready-mix concrete, air-placed concrete, concrete repair systems, industrial cement flooring, one-component and two-component sealing slurries, screeds, filling and self-levelling compositions, adhesives, sealants, coating and paint systems, mortars, grouts, or swelling explosives.

* * * * *